| United States Patent [19] | [11] | 4,328,972 |
|---|---|---|
| Albertson et al. | [45] | May 11, 1982 |

[54] SEAL RING AND METHOD OF MANUFACTURE

[75] Inventors: Kenneth R. Albertson, West Valley City; Ralph E. Peterson, Salt Lake City, both of Utah

[73] Assignee: Parker-Hannifin Corporation, Cleveland, Ohio

[21] Appl. No.: 214,922

[22] Filed: Dec. 10, 1980

[51] Int. Cl.³ .................... F16J 15/32; B32B 31/06; B32B 31/18

[52] U.S. Cl. ........................ 277/1; 277/124; 277/125; 277/205; 277/228; 29/148.4 S; 29/530; 264/138; 264/259

[58] Field of Search .................. 277/1, 124, 125, 165, 277/205, 206 R, 212 R, 212 C, 228, 152, 153; 29/148.4 S, 530; 264/318, 138, 241, 162, 259, 163; 428/161

[56] References Cited

U.S. PATENT DOCUMENTS

| 2,982,999 | 5/1961 | Stewart . | |
|---|---|---|---|
| 3,090,996 | 5/1963 | Reichenbach et al. . | |
| 3,199,191 | 8/1965 | Dega | 277/1 UX |
| 3,271,039 | 9/1966 | Kohl et al. | 277/228 |
| 3,342,500 | 9/1967 | Knudson | 277/124 |
| 3,356,778 | 12/1967 | Anderson | 264/45 |
| 3,359,613 | 12/1967 | Rye | 29/149.5 |
| 3,518,339 | 6/1970 | Goff | 264/249 |
| 3,653,672 | 4/1972 | Felt | 277/205 |
| 3,660,192 | 5/1972 | Smith et al. | 156/155 |
| 3,697,090 | 10/1972 | Brenneke | 277/157 |
| 3,861,646 | 1/1975 | Douglas | 251/356 |
| 4,066,269 | 1/1978 | Linne | 277/228 |
| 4,141,562 | 2/1979 | Wu | 277/1 |

FOREIGN PATENT DOCUMENTS 975019 9/1975 Canada ................................. 277/1

Primary Examiner—Robert S. Ward, Jr.
Attorney, Agent, or Firm—James A. Baker

[57] ABSTRACT

A sealing ring having a U-shaped shell member and an actuator member formed in situ from liquid elastomer. The shell member has a base portion with two legs extending from the base to form a cavity therebetween which is filled with the liquid elastomer and cured in situ. This integrally formed U-shaped composite ring seal yields a highly reliable seal with minimal dimensional variation problems and is easy and economical to manufacture.

9 Claims, 7 Drawing Figures

SEAL RING AND METHOD OF MANUFACTURE

BACKGROUND OF THE INVENTION

This invention relates generally to the field of machinery joint packing or fluid sealing members and more specifically to an improved U-shaped composite packing ring seal and a method for making same.

"U" type ring seals are for use in sealing dynamic and static hydraulic or gas applications for prevention of internal and external leakage. "U" type seals are pressure energized with pressure against the open end of the "U" acting equally on the inner surface in all directions, statically balancing the seal. U-seals are normally assembled with an interference fit with the width dimension between sealing lips being most critical especially in dynamic machinery joint packing applications. This interference fit of the sealing lips must provide for good sealing which will withstand frictional wear problems.

In the past multiple part "U" type seals have found great usage due to their ability to provide the desired ultimate sealing properties. Seals of this type are, for example, illustrated and described in U.S. Pat. No. 3,342,500 to C. B. Knudson and U.S. Pat. No. 3,653,672 to Maurice D. Felt. These prior art seals due to their multipart, nonintegral construction, however, can lead to sealing reliability problems. The separately formed parts of this ultimate seal construction all have manufacturing tolerances which in the aggregate can easily produce wide variations in the critical sealing dimensions from seal to seal which in turn gives rise to sealing problems in machinery joint packing use. That is, the outer U-shaped packing ring and the internal insert member both have manufacturing tolerances which when combined with finish operation variations can lead to standard size seals with wide variations of critical dimensions.

Additionally, many seals of various sizes are needed for the numerous machinery joint packing applications which necessitates the need for manufacture and accurate inventory of many components many of which can be nearly the same size. Efforts have to be made to insure individual component parts of the seal and especially the internal member are not mixed together or mistaken one for another. Lastly, the use of the multipart construction which is not integrally formed together necessitates final assembly operations and the costs associated with them.

Accordingly, it is an object of the present invention to provide a novel sealing ring member which is rugged, effective and reliable in use and simple in design and economical to manufacture.

It is another object of this invention to provide an integrally formed composite sealing ring.

It is another object of this invention to provide an integrally formed U-shaped composite sealing ring.

It is yet another object of this invention to provide a method for producing an integrally formed composite sealing ring with high reproducibility sealing ring to sealing ring.

It is still another object of the invention to provide a method for producing an integrally formed U-shaped composite sealing ring which is reliable in use and economical to manufacture.

These and other objects of the invention will become apparent to those skilled in the art from a reading of the following specification and claims.

Briefly the foregoing objects are accomplished by providing U-shaped composite packing ring seal including a U-shaped shell member and an actuator member formed in situ in which the shell member has in transverse cross section a base portion with two legs extending from the base to form a cavity therebetween. This cavity is filled with liquid elastomer which is cured in situ to form the actuator portion of seal. This integrally formed U-shaped composite ring seal yields a highly reliable seal with minimal dimensional variation problems. Also this seal is easy and economical to manufacture.

The invention also includes the provision of a method for making a U-shaped composite ring seal including: forming a U-shaped shell having a base, two legs extending from the base and a cavity between the legs; filling the cavity with a liquid material which forms a substantially incompressible elastomer material when cured; curing said material and moving a cutting tool along a predetermined path to remove a portion of said legs and said material thereby providing for the sealing lips of the seal. This method of integral seal construction does away with final seal assembly operations and the costs associated with them. Also by varying the cutting angle calibration adjustments can be made in critical lip seal dimension in the as assembled state.

BRIEF DESCRIPTION OF THE DRWINGS

In the drawing, like numbers and letters are used to identify like and similar parts throughout the several views.

DETAILED DESCRIPTION OF PREFERRED EMBODIMENTS OF THE INVENTION

Figure 1:
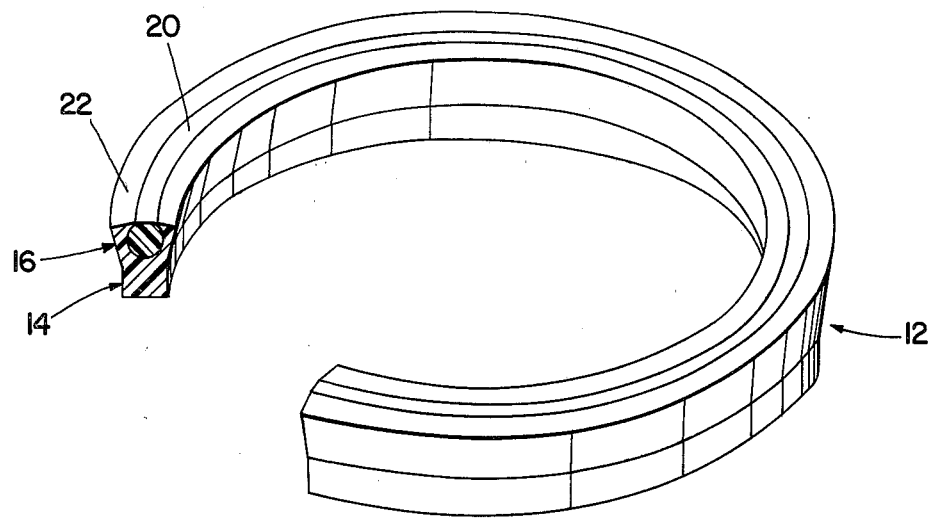
FIG. 1 is a perspective view of a sealing ring embodying the present invention, partly in section.
Figure 2:
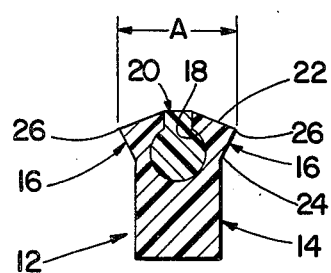
FIG. 2 is an enlarged cross section of the sealing ring of FIG. 1.

Referring now to the drawings by reference characters, there is shown in FIG. 1 a composite packing or sealing ring generally designated 10 having an outer U-shaped shell member 12. Shell member 12 as best shown in FIG. 2 has a base portion 14 with two leg members 16 extending from base portion 14 to define a cavity 18. Shell member 12 can be made from any suitable resilient, incompressable, deformable elastomer or plastic composition such as polyurethane, rubber, neoprene, teflon or the like. Preferably, this material has a high abrasion resistance with a shore A durometer reading of over 90.

Cavity 18 is filled with a liquid elastomeric material which is cured in situ yielding an actuator member 20 of the ring. The liquid elastomer forming actuator member 20 which essentially fills cavity 18 is chosen to be highly resilient low compression set liquid polymer material having flowability properties in the liquid state such as a silicone rubber. The resilient actuator has a shore A durometer reading of below 85 and preferably 65 or below in the cured form.

Describing the ring in more detail, the leg members 16 extending from base portion 14 preferably flare outwardly as they reach their distal end and each has a shoulder 22. This shoulder area 22 extends outwardly on each leg until it intersects outside flared wall portion 24 of the legs to form "sealing lips" 26 of the ring. As shown by FIG. 2 the line defining the outer wall of the shoulder area forms an angle Z with the plane contacting the ends of the legs. This angle Z is preferably from zero to 45 degrees. The distance between the "sealing lips" 26 is designated A and is a very critical dimension in ring seal design as will be further explained below.

The liquid polymer which forms actuator 20 is placed in cavity 18 filling the entire volume and is cured in situ preferably forming a single integral packing ring. This construction provides uniform sealing properties in use from sealing ring to sealing ring. That is, the critical dimension A varies only as provided by the manufacturing tolerance of the shell and the use of the liquid polymer cured in situ for the actuator does not effect this dimension. There is no additional solid actuator member inserted in the cavity. Additionally the actuator formed from the liquid polymer will uniformly fill the cavity providing consistent actuator forces in response to all types and directions of load. Finally if some change is needed in sealing lip dimension A it can be accomplished in final or "assembled" ring seal form as part of the cutting operation as will be described below.

In the practice of the present invention, shell member 12 as shown in cross section in 3A of elastomeric material such as polyurethane or the like is molded by conventional means to the desired U-shape as described above. The shell material should have good wear and abrasion resistance and compression set. The shell material may contain fibers or fillers to modify shell properties as desired.

Figures 3A, 3B, 3C, 3D:
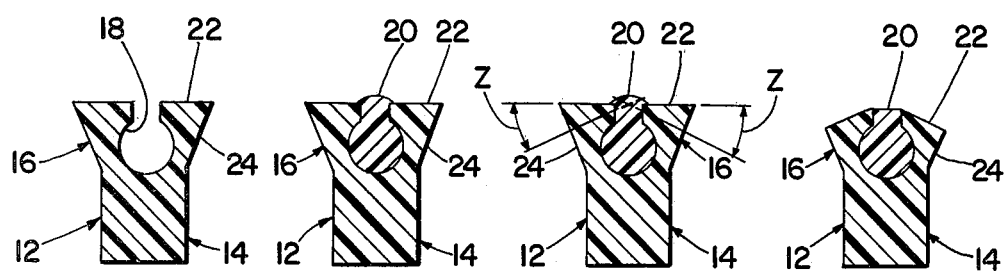
FIGS. 3A-3D are a diagramatic view in enlarged cross section of the sealing ring of FIG. 1 during the steps of its manufacture.

The cavity of the shell member is then filled with a liquid elastomer component (as shown in FIG. 3B) having low compression set and compatibility with the intended sealing environment. A preferred elastomer includes various combinations of vinyl-functional dimethyl siloxane polymers together with the catalyst and crosslinkers required to achieve curing. An example is a 50/50 ratio of the vinyl-functional dimethyl siloxane polymers with the catalyst and crosslinkers. This elastomer is especially good due to the fact that it does not give off moisture or gases during curing. An example of a commerical elastomer of this type is a Dow Corning two component liquid silicon rubber referred to as Silastic Liquid Silicon Rubber, Q3-9591. Other liquid elastomeric polymer systems would also be functional so long as they were in a flowable condition. A typical viscosity representing a flowable elastomeric polymer would be 1500 poise at room temperature in the liquid state ready for pouring.

The liquid elastomer is then cured. The curing time varied with temperature but a preferred time is two hours and thirty minutes at 275° F. in a conventional curing furnace. It is to be understood, however, that other curing processes of different times and temperatures could equally well be used.

Finally the U-shaped sealing ring is then cut, as, for example, shown in FIG. 3C. The cut as by a lathe or similar device is typically a single uninterrupted cut forming an acute angle Z of between 0 and 45 degrees with the horizontal for each leg. This cut angle can be varied to accommodate seal ring size variations, so as to precisely set the critical dimension A as shown in FIG. 2 and discussed above. A final trim operation can also be used to square off the top of the sealing ring. This finish trim operation, if used, neatly finishes off the surface of the sealing ring yielding the final product as shown in cross section in FIG. 3D.

Figure 4:
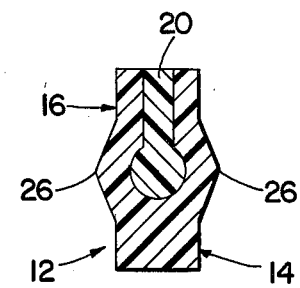
FIG. 4 is an enlarged cross section of another embodiment of a sealing ring.

FIG. 4 shows in cross section another embodiment of the present invention especially useful in applications where a seal is needed when there are fluid forces present alternatively from both the top and the bottom. This ring seal has similar components to that of the seal of FIG. 2 and is identified with like members and letters. The process for producing this U-shaped ring seal would be identical to that described above for the ring seal of FIG. 2.

From the foregoing, it is obvious that the U-shaped ring seal and the method of manufacture of the present invention provide for and makes it possible to produce uniform highly reliable U-shaped ring seals in an efficient and economical manner. The ring seal of this invention provides for having uniformity in the critical "lip seal" dimension from seal to seal in addition to uniform sealing response characteristics in use.

While there have been described herein what are at present considered to be the preferred embodiments of this invention, it will be apparent to those skilled in the art that various changes and modifications may be made therein without departing from the invention, and it is, therefore, intended in the appended claims to cover all such changes and modifications as all within the spirit and scope of the invention.

What is claimed is:

1. A U-shaped annular packing member comprising a shell portion and an actuator portion; said shell being an integral one piece member of a deformable incompressible material, said shell having in transverse cross section, a base and two legs extending from said base, said legs terminating at a free end and defining a cavity therebetween; said cavity being substantially filled with liquid elastomer and cured in situ to form said actuator portion thereby providing the packing member with closely controllable dimensions while providing good sealing properties.

2. The packing member of claim 1 wherein said shell portion and said actuator portion form an integral bonded packing member.

3. The packing member of claim 1 wherein a trim operation is performed on the member as assembled for dimensional calibration.

4. The packing member of claim 2 wherein said liquid elastomer does not generate moisture or gases during curing.

5. A method of making a U-shaped ring seal comprising the steps of forming a U-shaped shell having in transverse cross section a base, two legs extending from the base and a cavity between the legs; filling the cavity with a liquid material which forms a substantially incompressible elastomer material when cured; curing said material and moving a cutting means along a predetermined path to remove a portion of said legs and said material thereby providing for sealing lips of the seal.

6. The method as set forth in claim 5 which further includes trimming said legs and said material to square off the top of said seal.

7. The method as set forth in claim 5 wherein said curing forms an integrally bonded shell between said shell and said material.

8. The method as set forth in claim 5 wherein said two legs flare outwardly toward their distal end so that the cutting step performed in the finished ring state further provides a calibrating function for the ring seal.

9. The method as set forth in claim 8 wherein the calibrating function is provided by adjusting angle of cut to provide desired lip seal dimension.

* * * * *